Patented Sept. 1, 1942

2,294,452

UNITED STATES PATENT OFFICE 2,294,452

RESILIENT BUSHING

Frederick M. Guy, Detroit, Mich., assignor to Guy and Murton, Incorporated, Detroit, Mich., a corporation of Michigan Application May 22, 1939, Serial No. 274,929

3 Claims. (Cl. 287—85)

This invention relates to resilient bushings, couplings, joints, or the like, and to a method of making or assembling the same.

I am aware of the fact that prior to the present invention resilient bushings have been made in which an inner metal member and an outer metal sleeve or member have been connected together through the medium of an intermediate layer or sleeve of rubber or other resilient material. In some instances the intermediate rubber sleeve has been of sufficient length to extend beyond and overlie the opposite ends of the outer metal sleeve to insulate said metal sleeve from adjacent metal end members or connections to which the bushing was attached. As the result of such a structure the end portions of the rubber sleeve were subjected to great wear due to the forces set up by the axial or longitudinal radial and rotative or oscillatable movements of the parts. This, in addition to frictional heat, served to break down the structure of the rubber sleeve and soon rendered it unfit for the purpose for which it was designed.

Resilient bushings have also been made in which rubber dust washers have been employed at the ends of the bushing to exclude dirt and other foreign matter from the joint or bushing.

One of the objects of the present invention, therefore, is to provide a resilient bushing, or the like, which is adapted to permit relative movement of the connected members through a body of compressed resilient material, such as rubber, and to provide such bushing with additional and separate resilient material held under compression and located at opposite ends of the bushing for absorbing end thrusts to which the bushing is subjected.

Another object of the invention is to provide a resilient bushing or the like of the foregoing character which is of simple construction, relatively inexpensive to manufacture, easy to assemble and apply and one in which the rubber or other resilient inserts are subjected to a minimum of wear, thus materially increasing the life of the bushing.

A further object of the present invention is to provide a resilient bushing or the like of the foregoing character in which the novel structure thereof permits the movement of the connected parts through distortion occurring in the body of the rubber or other resilient members without allowing any slippage of the metal parts on the surfaces of the rubber members, thus increasing the life of the bushing and permitting the absorption by the rubber members of forces imposed upon them without dissipating some portion of said forces in the form of heat.

Another object of the invention is to provide a new and improved resilient bushing or the like having rubber or other resilient force absorbing members which act as washers to prevent metal-to-metal contact of the parts, and as dust and oil sealing means, and which also provide resilient members which permit the relative movements of the connected parts without causing a wear or scuffing on the surfaces of the rubber.

A further object of the invention is to provide a novel method of making and/or assembling resilient bushings, couplings or joints embodying the invention.

The above and other objects and advantages of the foregoing invention will appear in the following description and appended claims, reference being had to the accompanying drawing forming a part of this specification wherein like reference characters designate corresponding parts in the several views.

In said drawing:

Fig. 1 is a sectional view, partly in elevation, through a resilient bushing embodying the present invention.

Fig. 2 is a view of some of the component parts of the bushing of Fig. 1, illustrating the relative positions of these parts during the method of making or assembling the bushing.

Fig. 3 is a view illustrating the relative positions of the parts during another step of the method of making or assembling the bushing in accordance with the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Figs. 1 to 3 inclusive of the drawing, the resilient bushing of the present form comprises a sleeve or cylindrical member 9, a pin, bolt or core member 10 having, as shown, a fixed head 11 at one end thereof and a reduced portion 10a at its opposite end. The bolt 10 extends through the sleeve or housing 9 and is spaced from the sleeve by means of a resilient bushing or sleeve 12 formed of rubber or the like.

The sleeve or shell 9 has at its opposite ends annular enlargements or shoulders 9a and 9b. Interposed between the shoulder 9a and the fixed head or end 11 of the bolt is a resilient ring-like member which, as shown, is in the form of a body of rubber 13. A similar ring or body of rubber 14 is interposed between the annular shoulder 9b at the opposite end of the sleeve and a metal plate or disk 15 which is applied to the reduced end 10a of the bolt and held in place relative to the other parts of the bushing by upsetting or riveting the end of the bolt to provide the head 16. It will be understood that the rubber sleeve 12 and the rubber rings 13 and 14 are held under compression and permit the movement of the connected parts of the bushing through distortion occurring in the body of these rubber parts without allowing any slippage of the metal parts on the surfaces of the rubber members, thus increasing the life of the bushing and permitting the absorption by the rubber members of forces imposed upon them without dissipating some portion of said forces in the form of heat which, obviously, would be objectionable.

The rubber members 13 and 14 provide force absorbing members which act as washers to prevent metal-to-metal contact between the sleeve 9 and the end members or plates 11 and 15 of the pin or shaft 10. They also serve as dust and oil sealing means for the joint and provide, in addition, resilient members which permit the relative movements of the connected parts without causing a wear or scuffing on the surfaces of the rubber.

One method of making or assembling the resilient bushing of Fig. 1 is illustrated, merely by way of example, in Figs. 2 and 3. As seen in Fig. 2, the first step in the method of making the bushing is to insert the rubber sleeve or cylinder 12a into the bore of the outer sleeve or shell 9. The rubber ring or bushing member 13a is then applied to the shank of the pin or bolt 10 and the reduced end 10a of the pin moved in the direction of the arrow into contact with the rubber sleeve or body 12a. This operation may take place in a press or other suitable apparatus capable of forcing the pin 10 through the bore of the bushing 12a to distort and elongate said bushing toward its elastic limit until it assumes the shape and proportions shown at 12 in Figs. 1 and 3.

The next step in the process of making or assembling the bushing is illustrated in Fig. 3. After the pin or bolt 10 has been driven through the rubber sleeve, the rubber ring or body 14a is applied to the face of the sleeve abutment 9b, whereupon the apertured metal disk or plate 15 is slipped over the reduced end portion 10a of the bolt and pressure applied in opposite directions, as indicated by the arrows, to the head 11 and the plate 15 to force the parts together until they assume the positions shown in Fig. 1. While so held, the end of the shank 10a is upset to clamp the parts together, this upsetting or riveting-over step producing the integral head 16, Fig. 1. During the application of force or pressure in opposite directions longitudinally of the coupling, the rubber rings 13a and 14a are deformed until they assume the shape in which they are shown at 13 and 14 in Fig. 1. These rubber rings or washers, as previously explained, are held under compression between the adjacent faces of the head 11, shoulder 9a and the clamping disk or plate 15 and the annular shoulder or abutment 9b.

It will be understood that the resilient bushing of Figs. 1 to 3 inclusive may be employed in various ways, such for example as in connection with the spring shackle assembly of a vehicle chassis.

I claim:

1. A resilient bushing comprising a cylindrical metal sleeve having a body portion and integral enlargements providing flat annular surfaces at its opposite outer ends of greater outside diameter than the outside diameter of said body portion, a shaft extending through the sleeve, a tubular rubber bushing located between the metal sleeve and shaft and held under compression therebetween, said shaft having an integral disk at one end thereof of substantially the same diameter as said enlargements, a second disk mounted upon the opposite end of the shaft of substantially the same diameter as said integral disk, a rubber ring located between the first disk and the enlarged annular flat surface at the adjacent end portion of the metal sleeve, and a second rubber ring located between the second disk and the enlarged annular flat surface at the opposite end portion of said metal sleeve, both of said rings being under compression, said tubular rubber bushing being subjected to compressive forces from the approximate longitudinal center thereof outwardly in opposite directions.

2. A resilient bushing comprising a metal sleeve having a cylindrical body portion and integral enlargements providing flat annular outside faces at its outer ends of greater outside diameter than the outside diameter of said cylindrical body portion, a shaft extending through the sleeve, a rubber bushing located between the metal sleeve and shaft and held under compression therebetween, said shaft having an integral disk at one end thereof, a second disk mounted upon the opposite end of the shaft, a rubber ring located between the first disk and the flat annular face of the enlargement at the adjacent end of the body portion of the metal sleeve, a second rubber ring located between the second disk and the adjacent flat annular face of the enlargement at the opposite end of the body portion of said metal sleeve, and means for holding the parts together to apply pressure to both of said rubber rings, said rubber bushing being subjected to compressive forces from its approximate longitudinal center outwardly in opposite directions.

3. A resilient bushing comprising a metal sleeve having a cylindrical body portion and integral enlargements providing flat annular outside faces at its outer ends of greater outside diameter than the outside diameter of said cylindrical body portion, a shaft extending through the sleeve, a rubber bushing located between the metal sleeve and shaft and held under compression therebetween, said shaft having an integral disk at one end thereof, a second disk mounted upon the opposite end of the shaft, a rubber ring located between the first disk and the flat annular face of the enlargement at the adjacent end of the body portion of the metal sleeve, a second rubber ring located between the second disk and the adjacent flat annular face of the enlargement at the opposite end of the body portion of said metal sleeve, and means for holding the parts together to apply pressure to both of said rubber rings, said rubber bushing being subjected to compressive forces from its approximate longitudinal center outwardly in opposite directions, said flat annular outside faces of the enlargements extending at right angles to the longitudinal axis through the body portion of said metal sleeve.

FREDERICK M. GUY.